(12) United States Patent
Lee et al.

(10) Patent No.: US 8,954,585 B2
(45) Date of Patent: Feb. 10, 2015

(54) APPARATUS FOR RESOURCE ALLOCATION IN A FREQUENCY OVERLAY SYSTEM AND A METHOD THEREOF

(75) Inventors: Sang Min Lee, Seoul (KR); Jae Hee Cho, Seoul (KR); Kwan Hee Roh, Hwaseong-si (KR); Hee Kwun Cho, Incheon (KR); Hyun Jeong Kang, Seoul (KR); Byung Wook Jun, Seoul (KR); Pisut Sanyadechukal, Suwon-si (KR); Yung Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 873 days.

(21) Appl. No.: 13/054,174

(22) PCT Filed: Jul. 15, 2009

(86) PCT No.: PCT/KR2009/003901
§ 371 (c)(1),
(2), (4) Date: Jan. 14, 2011

(87) PCT Pub. No.: WO2010/008207
PCT Pub. Date: Jan. 21, 2010

(65) Prior Publication Data
US 2011/0119385 A1 May 19, 2011

(30) Foreign Application Priority Data

Jul. 17, 2008 (KR) .......................... 10-2008-0069645

(51) Int. Cl.
*G06F 15/173* (2006.01)
*H04W 72/04* (2009.01)
*H04W 8/26* (2009.01)
*H04W 28/06* (2009.01)

(52) U.S. Cl.
CPC .............. *H04W 72/042* (2013.01); *H04W 8/26* (2013.01); *H04W 28/06* (2013.01)

USPC .......................... 709/226; 709/223; 709/229

(58) Field of Classification Search
None
See application file for complete search history.

(56) References Cited

U.S. PATENT DOCUMENTS

| | | | |
|---|---|---|---|
| 7,336,200 B2* | 2/2008 | Osterloh et al. | 340/870.02 |
| 2006/0126546 A1* | 6/2006 | Lee et al. | 370/310 |
| 2006/0240838 A1* | 10/2006 | Suh et al. | 455/454 |
| 2006/0291414 A1* | 12/2006 | Lim et al. | 370/329 |

* cited by examiner

*Primary Examiner* — Mohamed Ibrahim
(74) *Attorney, Agent, or Firm* — Jefferson IP Law, LLP

(57) ABSTRACT

A resource allocation method and apparatus for a frequency overlay system that is capable of reducing the overhead of the resource allocation information transmitted by the base station is provided. A frequency overlay system of the present invention includes a base station which transmits resource allocation information including an address type selected among multiple address types designating addresses for transmission resource in different patterns and an address value indicating a resource region allocated according to the selected address type and at least one mobile station which receives the resource allocation information and receives data through the resource region identified with reference to the resource type and address value indicated by the resource allocation information; and a resource allocation method of the present invention includes transmitting, at a base station, resource allocation information including an address type selected among multiple address types designating addresses for transmission resource in different patterns and an address value indicating a resource region allocated according to the selected address type, and receiving, at a mobile station, data through the resource region identified with reference to the resource type and address value indicated by the resource allocation information.

20 Claims, 8 Drawing Sheets

Fig. 3

| FA1 | FA2 | FA3 | FA4 |
|---|---|---|---|
| 0 | 8 | 16 | 24 |
| 1 | 9 | 17 | 25 |
| 2 | 10 | 18 | 26 |
| 3 | 11 | 19 | 27 |
| 4 | 12 | 20 | 28 |
| 5 | 13 | 21 | 29 |
| 6 | 14 | 22 | 30 |
| 7 | 15 | 23 | 31 |

(a)

| FA1 | FA2 | FA3 | FA4 |
|---|---|---|---|
| 0 | 1 | 16 | 17 |
| 2 | 3 | 18 | 19 |
| 4 | 5 | 20 | 21 |
| 6 | 7 | 22 | 23 |
| 8 | 9 | 24 | 25 |
| 10 | 11 | 26 | 27 |
| 12 | 13 | 28 | 29 |
| 14 | 15 | 30 | 31 |

(b)

| FA1 | FA2 | FA3 | FA4 |
|---|---|---|---|
| 17 | 0 | 1 | 16 |
| 19 | 2 | 3 | 18 |
| 21 | 4 | 5 | 20 |
| 23 | 6 | 7 | 22 |
| 25 | 8 | 9 | 24 |
| 27 | 10 | 11 | 26 |
| 29 | 12 | 13 | 28 |
| 31 | 14 | 15 | 30 |

(c)

| FA1 | FA2 | FA3 | FA4 |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | 18 | 19 |
| 20 | 21 | 22 | 23 |
| 24 | 25 | 26 | 27 |
| 28 | 29 | 30 | 31 |

(d)

APPARATUS FOR RESOURCE ALLOCATION IN A FREQUENCY OVERLAY SYSTEM AND A METHOD THEREOF

TECHNICAL FIELD

The present invention relates to a frequency overlay system and, in particular, to a resource allocation method and apparatus for a frequency overlay system that is capable of reducing overhead of the resource allocation information transmitted by a base station.

BACKGROUND ART

Frequency overlay system is defined as a system where a base station divides the available frequency bandwidth into multiple frequency bands and allocates the resource of one or more frequency bands to a mobile station depending on the capacity of the mobile station.

Accordingly, the frequency overlay system is advantageous to support the mobile stations operating with various bandwidths.

In the frequency overlay system, the base station divides the radio resource into multiple Frequency Assignments (FAs) and allocates the resource of one or more FAs to a mobile station depending on the bandwidth supported by the mobile station. For instance, assuming a frequency overlay system operating with 20 MHz bandwidth and supporting mobile stations operating with 10 MHz and 20 MHz bandwidths respectively, the base station allocates resource of a single FA to the 10 MHz mobile station and resource of 2 FAs to the 20 MHz mobile station.

In the frequency overlay system, a base station generates and transmits a resource allocation information message per FA such that, in order to allocate resource of multiple FAs, the same number of resource allocation information messages are transmitted to the mobile station. That is, when a mobile station is allocated transmission resources of FA1 and FA2, the base station sends the mobile station two resource allocation information messages for the respective FA1 and FA2. Accordingly, the mobile station allocated multiple FAs must receive and decode all the resource allocation information messages transmitted separately for the respective FAs, thereby increasing the decoding complexity and resource allocation information message overhead in proportion of the number of the allocated FAs.

DISCLOSURE OF INVENTION

Technical Problem

In order to overcome the above problems of the prior art, the present invention provides a resource allocation method and apparatus for a frequency overlay system that is capable of reducing resource allocation message overhead by minimizing the amount of resource allocation information and the entire message overhead by transmitting resource allocation information through a single FA channel.

Technical Solution

In accordance with an exemplary embodiment of the present invention, a frequency overlay system includes a base station which transmits resource allocation information including an address type selected among multiple address types designating addresses for transmission resource in different patterns and an address value indicating a resource region allocated according to the selected address type; and at least one mobile station which receives the resource allocation information and receives data through the resource region identified with reference to the resource type and address value indicated by the resource allocation information.

Preferably, the address type is characterized in that the base station divides each of transmission blocks constituting the transmission resource by a maximum number of Frequency Assignments (FAs) into a plurality of sub-transmission resource blocks and allocates the transmission resource in unit of sub-transmission resource blocks across the FAs.

In accordance with another exemplary embodiment of the present invention, a resource allocation method for a frequency overlay system includes transmitting, at a base station, resource allocation information including an address type selected among multiple address types designating addresses for transmission resource in different patterns and an address value indicating a resource region allocated according to the selected address type; and receiving, at a mobile station, data through the resource region identified with reference to the resource type and address value indicated by the resource allocation information.

Preferably, the selected address type is characterized in that the base station divides each of transmission blocks constituting the transmission resource by a maximum number of Frequency Assignments (FAs) into a plurality of sub-transmission resource blocks and allocates the transmission resource in unit of sub-transmission resource blocks across the FAs.

In accordance with another exemplary embodiment of the present invention, a resource allocation apparatus of a base station for a frequency overlay system in which available frequency bandwidth is divided into a plurality of frequency bands includes an address type selector which selects an address type to be used for allocating transmission resource to one of mobile stations connected to the base station according to supportable Frequency Assignments (FAs) of the mobile station; a resource allocator which generates resource allocation information including the address type selected by the address type selector and an address value indicating a resource region allocated according to the address type; and a MAP transmitter which generates a MAP message including the resource allocation information and transmits the MAP message through a primary FA of the mobile station.

Preferably, the address type is characterized in that the base station divides each of transmission blocks constituting the transmission resource by a maximum number of Frequency Assignments (FAs) into a plurality of sub-transmission resource blocks and allocates the transmission resource in unit of sub-transmission resource blocks across the FAs.

In accordance with another exemplary embodiment of the present invention, a resource allocation method of a base station for a frequency overlay system in which available frequency bandwidth is divided into a plurality of frequency bands includes generating resource allocation information including an address value indicating a resource region allocated according to an address type selected among multiple address types; generating a MAP message including the resource allocation information; and transmitting the MAP message through a primary Frequency Assignment (FA) of a mobile station.

Preferably, the address type is characterized in that the base station divides each of transmission blocks constituting the transmission resource by a maximum number of FAs into a plurality of sub-transmission resource blocks and allocates the transmission resource in unit of sub-transmission resource blocks across the FAs.

In accordance with another exemplary embodiment of the present invention, a resource allocation apparatus of a mobile station for a frequency overlay system in which available frequency bandwidth is divided into a plurality of frequency bands includes a MAP analyzer which receives a MAP message through a primary Frequency Assignment (FA) of the mobile station and extracts resource allocation information from the MAP message; and a data processor which determines a transmission resource region allocated to the mobile station with reference to an address type and address value designated according to the address type and processes data received through a transmission resource region.

Preferably, the address type is characterized in that the base station divides each of transmission blocks constituting the transmission resource by a maximum number of Frequency Assignments (FAs) into a plurality of sub-transmission resource blocks and allocates the transmission resource in unit of sub-transmission resource blocks across the FAs.

In accordance with another exemplary embodiment of the present invention, a resource allocation method of a mobile station for a frequency overlay system in which available frequency bandwidth is divided into a plurality of frequency bands includes extracting resource allocation information from a MAP message received through a primary frequency assignment of the mobile station; and receiving data through a transmission resource region identified with reference to an address type and address value designated according to the address type included in the resource allocation information.

Preferably, the address type is characterized in that the base station divides each of transmission blocks constituting the transmission resource by a maximum number of Frequency Assignments (FAs) into a plurality of sub-transmission resource blocks and allocates the transmission resource in unit of sub-transmission resource blocks across the FAs.

Advantageous Effects

The resource allocation method and apparatus of the present invention informs a mobile station of a resource allocated across multiple FAs through a signal primary FA using a unique address type and address value designated according to the address type rather than transmitting resource allocation information of the respective FAs individually, thereby reducing resource allocation message overhead and thus improving system performance.

BRIEF DESCRIPTION OF DRAWINGS

FIG. 3 is a diagram illustrating aspects of the transmission resource of FIG. 2 as allocated to the respective mobile stations;

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figures 1, 2:
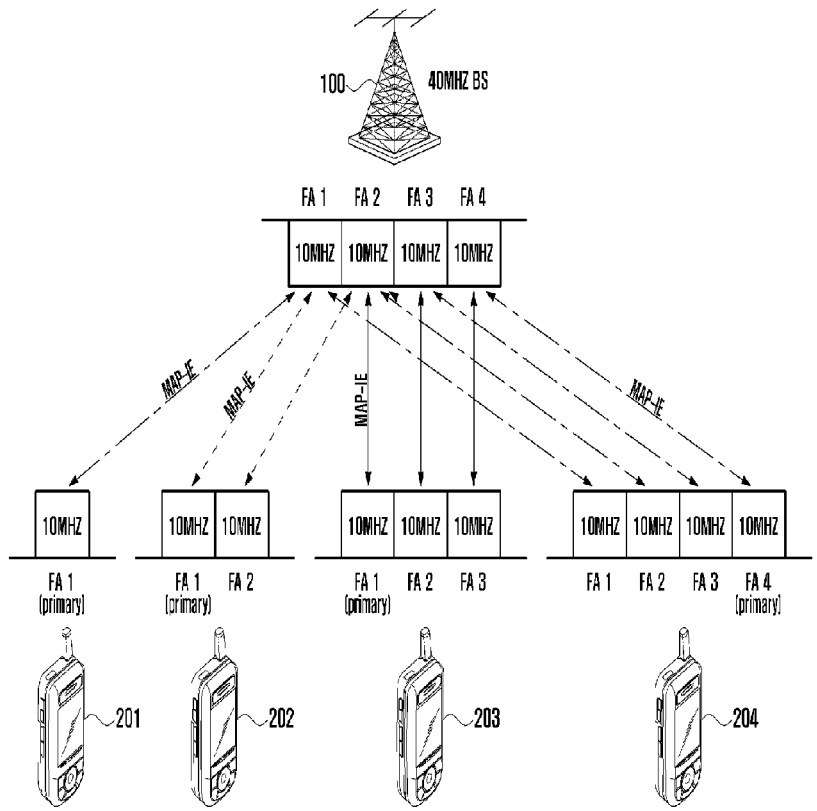
FIG. 1 is a conceptual diagram illustrating a frequency overlay system according to an exemplary embodiment of the present invention.
FIG. 2 shows a structure of a transmission resource managed by a base station according to an exemplary embodiment of the present invention

A concept of a frequency overlay system according to an exemplary embodiment of the present invention is described first. FIG. 1 is a conceptual diagram illustrating a frequency overlay system according to an exemplary embodiment of the present invention.

The frequency overlay system according to an exemplary embodiment of the present invention includes a base station 100 which manages the frequency bandwidth in the form of split frequency bands and a plurality of mobile stations 201 to 204 communicate with the base station 100 using one or more frequency bands. Hereinafter, the mobile stations 201 to 204 are called representatively as "mobile station" with reference number 200, if necessary.

In FIG. 1, it is assumed that the frequency bandwidth assigned to the base station is 40 MHz and can be divided into frequency bands. Each frequency band is called Frequency Assignment (FA). Particularly in this embodiment, the base station divides the 40 MHz frequency bandwidth into four 10 MHz FAs designated as FA 1, FA 2, FA 3, and FA 4.

The mobile stations 201 to 204 have different capabilities to operate with specific frequency bandwidths, respectively. The frequency bandwidth determined by the mobile station's capability is called "supportable bandwidth". The mobile stations 201 to 204 can use one or more of the FA 1 to FA 4 according to their supportable bandwidths. The number of FAs and FA numbers to be allocated are determined through a capability negotiation process at network entry of the mobile station 200. Particularly when a mobile station 200 supports multiple FAs, the base station 100 and the mobile station 200 determine a primary FA.

Once the FAs for the mobile station 200 are determined, the base station 100 allocates the transmission resources of the FAs designated for the mobile station 200 and sends the resource allocation information, i.e. MAP-IE, through the primary FA.

As described above, in order for the mobile station 200 to communicate with the base station 100, the base station 100 and mobile station 200 should determine the number of FAs and FA through the capability negotiation process at the network entry of the mobile station 200.

That is, when the mobile station 200 initially accesses the base station 100, the base station 100 acquires the supportable bandwidth of the mobile station 200 and determines the number of FAs and FA numbers based of the supportable bandwidth. At this time, the base station 100 designates at least one available FA for the mobile station 200 based on the supportable bandwidth of the mobile station 200. The FA designated for the mobile station 200 is maintained before it changes through a separate procedure.

The base station 100 allocates the resource of the designated FA to the mobile station 200. Referring to FIG. 1, the base station 100 designates FA 1 for the first mobile station 201 supporting 10 MHz bandwidth and sends the first mobile station 201 the resource allocation information (MAP-IE) through the FA 1.

The base station 100 can designate two of the FA 1 to FA 4 for the second mobile station supporting 20 MHz bandwidth. It is assumed that the FA 1 and FA 2 are designated for the second mobile station 202 in the negotiation process. Also, the FA 1 is designated as the primary FA for the second mobile station 202. In this case, the second mobile station 202 is allocated the resource of FA 1 and FA 2 and receives the resource allocation information (MAP-IE) through the FA 1. Similarly, the third mobile station 203 having the supportable bandwidth of 30 MHz is allocated transmission resources of the FA 2 to FA 4 and receives the resource allocation information (MAP-IE) through the FA2 as the primary FA. Also, the fourth mobile station 204 supporting 40 MHz bandwidth is allocated transmission resources of the FA 1 to FA 4 and receives the resource allocation information (MAP-IE) through the FA 4 as the primary FA.

How the base station 100 allocates the resource to the base stations 201 to 204 is described hereinafter. FIGS. 2 and 3 are diagrams illustrating resource allocation method according to an exemplary embodiment of the present invention.

FIG. 2 shows a structure of a transmission resource managed by a base station according to an exemplary embodiment of the present invention. The transmission resource is divided into a plurality of FAs each including a plurality of transmission resource blocks. A transmission resource block is expressed as R(n,m) indicating $m^{th}$ block of FA n with M(n) indicating a number of allocated transmission resource blocks in FA n. Here, the transmission resource can be an uplink resource or a downlink resource, and the transmission resource block can be a unit of time or frequency.

As shown in FIG. 2, the allocation-available resource of the base station 100 is divided into four FAs, i.e. FA 1 to FA 4, and each FA is composed of 8 transmission resource blocks. Here, the resource of the base station 100 is allocated to the first to fourth mobile stations 201 to 204. The mobile station and the resource allocated thereto are expressed with the same hatching pattern.

In order to information the mobile station 200 of the resources allocated thereto, the base station 100 generates resource allocation information (MAP-IEs) for the respective mobile stations 201 to 204.

The base station allocates the resources to the mobile stations 201 to 204 independently according to supportable FAs of the mobile station 201 to 204 and generates the resource allocation information (MAP Information Elements; MAP-IEs). The resource allocation information (MAP-IE) contains the information on the locations of the transmission resource blocks allocated to the mobile station.

In an exemplary embodiment of the present invention, the resource allocation information (MAP Information Element; MAP IE) includes a "resource indicator" and an "address type (Addr_type)", and "designated address value".

The address type indicates an order to designate addresses for the resource blocks of the transmission resource. The "address" is the information indicating the location of a transmission resource block and expresses the location of the transmission resource block differently according to the "address type". That is, the address of a transmission resource block can be changed according to the resource type. The "designated address value" or "address value" is a value indicative of a address (location) of the transmission resource block allocated in accordance with a specific address type.

How to generate the resource allocation information in such resource allocation method is described hereinafter. FIG. 3 is a diagram illustrating aspects of the transmission resource of FIG. 2 as allocated to the respective mobile stations. The reference letters (a) to (d) denotes the aspects of the resource allocated to the first to fourth mobile stations 201 to 204, respectively.

In the aspect (a), the resource allocated to the first mobile station 201 is depicted along with the addresses designated for the resource blocks. Table 1 shows exemplary resource allocation information (MAP-IE) about the resource allocated to the first mobile station 201.

TABLE 1

| | Start-length | Start-end |
|---|---|---|
| Identifier | CID1 (4 FA MS) | |
| Modulation & Coding Scheme | MCS | |
| Designated address value | Start: 26, Length: 4 | Start: 26, end: 29 |
| Address type | Addr_type: 1 | Addr_type: 1 |
| Others | Etc. (power, MIMO related) | |

Referring to table 1, the resource allocation information (MAP-IE) includes a Connection ID (CID), a Modulation and Coding Scheme (MCS), and a resource indicator. Particularly, the resource indicator includes an Address type (Addr_type) and a designated address value. The resource allocation information (MAP-IE) can further include other information such as transmission power and antenna type (e.g., MIMO).

The CID is information for discriminating a plurality of mobile stations 200 connected to the base station 100 and includes information about how many FAs the corresponding mobile station 200 can use. The modulation and coding scheme (MCS) indicates how to modulate and code the transmission data. As aforementioned, the resource indicator includes the address type and designated address value. The designated address values can be expressed in a start-length indication scheme using the start address and length of the allocated resource or a start-end indication scheme using the start and end addresses of the allocated resource.

In more detail, in order to express the transmission resource allocated to the first mobile station 201, a type 1 is used as the address type (Addr_type). When using the first address type of type 1, the addresses 0 to 7 are designated from the first to the last resource blocks of the FA 1 in sequential order, and the rest addresses following the address 7 are designated for the resources blocks of FA 2, FA 3, and FA 4 in the same manner.

In FIG. 3, the base station 100 allocates the resource blocks indicated by the addresses 26 to 29 designated in type 1 to the first mobile station 201. In this case, the address value of the resource allocated to the first mobile station 201 can be expressed with the start address (start: 26) and the length (length: 4) from the start address to the end address (start-length indication scheme). That is, the resource blocks allocated to the first mobile station 201 can be expressed using the address type and a pair a start address and length of the allocated transmission resource.

In another exemplary embodiment of the present invention, the address value of the allocated transmission resource can be expressed with the start and end addresses (start-end indication scheme) of the allocated transmission resource blocks. That is, the address value of the resource allocated to the first mobile station 201 can be expressed with the start address (start: 26) and the end address (end: 29) rather than the length 4 from the start address to the end address.

In the aspect (b), the resource allocated to the second mobile station 202 is depicted with the addresses designated for the resource blocks. Table 2 shows exemplary resource allocation information (MAP-IE) about the resource allocated to the second mobile station 202.

TABLE 2

|  | Start-length | Start-end |
|---|---|---|
| Identifier | CID2 (4 FA MS) |  |
| Modulation & Coding Scheme | MCS |  |
| Designated address value | Start: 16, Length: 4 | Start: 16, end: 19 |
| Address type | Addr_type: 2 | Addr_type: 2 |
| Others | Etc. (power, MIMO related) |  |

In order to inform of the transmission resource allocated to the second mobile station 202, the address type of type 2 is used. The address type of type 2 is characterized in that the addresses are designated for the resource blocks of the FA 1 and FA 2 in zigzag pattern and then for the resource blocks of the FA 3 and FA 4 in the same pattern.

The base station allocates the transmission resource blocks having the addresses 16 to 19 designated in type 2 to the second mobile station 202. The resource allocated to the second mobile station 202 can be expressed with the start address (start: 16) and the length (length: 4) from the start address to the end address of the allocated transmission resource. The allocated transmission resource also can be expressed with the start address (start: 16) and the end address (end: 19) (start-end indication scheme).

In the aspect (c), the resource allocated to the third mobile station 203 is depicted with the addresses designated for the resource blocks. Table 3 shows exemplary resource allocation information (MAP-IE) about the resource allocated to the third mobile station 204.

TABLE 3

|  | Start-length | Start-end |
|---|---|---|
| Identifier | CID3 (4 FA MS) |  |
| Modulation & Coding Scheme | MCS |  |
| Designated address value | Start: 4, Length: 8 | Start: 4, end: 11 |
| Address type | Addr_type: 3 | Addr_type: 3 |
| Others | Etc. (power, MIMO related) |  |

In order to inform of the transmission resource allocated to the third mobile station 203, the address type of type 3 is used. The address type of type 3 is characterized in that the addresses are designated for the resource blocks of FA 2 and FA 3 first in zigzag pattern and then for the resource blocks of the FA 4 and FA 1 in zigzag pattern.

The base station allocates the transmission resource blocks having the addresses 4 to 11 designated in type 3 to the third mobile station 203. The resource allocated to the third mobile station 203 can be expressed with the start address (start: 4) and the length (length: 8) from the start address to the end address of the allocated transmission resource. The allocated transmission resource also can be expressed with the start address (start: 4) and the end address (end: 11).

In the aspect (d), the resource allocated to the fourth mobile station 204 is depicted with addresses designated for the resource blocks. Table 4 shows exemplary resource allocation information (MAP-IE) about the resource allocated to the fourth mobile station 204.

TABLE 4

|  | Start-length | Start-end |
|---|---|---|
| Identifier | CID4 (4 FA MS) |  |
| Modulation & Coding Scheme | MCS |  |
| Designated address value | Start: 24, Length: 8 | Start: 4, end: 11 |
| Address type | Addr_type: 4 | Addr_type: 4 |
| Others | Etc. (power, MIMO related) |  |

In order to inform of the transmission resource allocated to the fourth mobile station 204, the address type of type 4 is used.

The address type of type 3 is characterized in that the addresses are designated from the first blocks of the FA 1, FA 2, FA 3, and FA 4 to the last blocks of the FA 1, FA 2, FA 3, and FA 4 in sequential order.

The base station allocates the transmission resource blocks having the addresses 24 to 31 designated in address type 4 to the fourth mobile station 204. The transmission resource allocated to the fourth mobile station 204 can be expressed with the start address (start: 24) and the length (length: 8) from the start address to the end address of the allocated transmission resource (start-end indication scheme). The allocated transmission resource also can be expressed with the start address (start: 24) and the end address (end: 31).

As aforementioned, the base station 100 expresses the transmission resource allocated to a mobile station 200 according to the selected address type. The length of the allocated transmission resource is identical with a number of resource blocks from the start resource block to the end resource block constituting the allocated transmission resource. The mobile station 200 receives the resource allocation information transmitted by the base station 100 and identifies the allocated transmission resource with reference to the address type, start address, and length. In case of using the start-end indication scheme, the mobile station 200 receives the resource allocation information transmitted by the base station 200 and identifiers the allocated transmission resource with reference to the address type and start and end addresses of the allocated transmission resource.

In case of using the convention resource allocation method for informing the fourth mobile station 204 of the allocated transmission resource, the start address and length of the resource allocated in the FA 1, the start address and length of the resource allocated in the FA 2, the start address and length of the resource allocated in the FA 3, and the start address and length of the resource allocated in the FA 4 should be included in the resource allocation information. As compared to the conventional resource allocation method, the resource allocation method according to an exemplary embodiment of the present invention can reduce the data amount of the resource allocation information (MAP-IE) dramatically.

As aforementioned, the number of supportable FAs of a mobile station 200 can be determined according to the capability of the mobile station. Both the base station 100 and mobile station 200 must know the number of supportable FAs of the mobile station 200, and the number of supportable FAs is maintained before the capability is renegotiated.

Figures 4, 5:
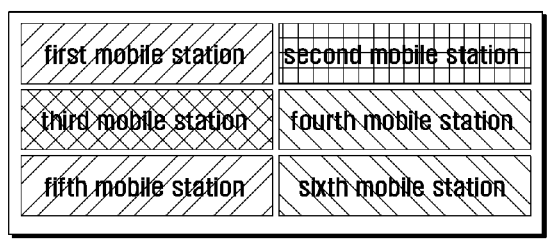
FIGS. 4 and 5 are diagrams illustrating resource allocation method according to another exemplary embodiment of the present invention.

The address type for allocating the resource is restricted by the number of FAs of the mobile station 200 negotiated with the base station 100. For instance, when it is negotiated to use two FAs, the base station 100 can use the address types that can express the resource within two FAs. If only one address type can express the resource within two FAs, there is no need to inform the terminal 200 of the address type. How to allocate the transmission resource and generate the resource allocation information, when the number of supportable FAs varies according to the available bandwidth of the mobile station 200, is described hereinafter. FIGS. 4 and 5 are diagrams illustrating resource allocation method according to another exemplary embodiment of the present invention.

FIG. 4 shows a structure of a transmission resource managed by a based station according to another exemplary embodiment of the present invention. The available transmission resource is divided into FA 1 to FA 4 each including 8 transmission resource blocks. Here, the transmission resource is allocated to the first to sixth mobile stations 201 to 206. The mobile station and the resource allocated thereto are expressed with the same hatching pattern.

The first to fourth mobile stations 201 to 204 are allocated transmission resources from the four FAs, and the fifth and sixth mobile stations 205 and 206 are allocated from two of four FAs. The first to fourth mobile stations 201 to 204 are allocated the transmission resources as described with reference to FIGS. 2 and 3. The fifth and sixth mobile stations 205 and 206 can be allocated transmission resources of two FAs, and the resource allocation information is generated according to an address type supporting two FAs.

How to generate the resource allocation information for the mobile stations 200 using multiple FAs is described hereinafter.

FIG. 5 is a diagram illustrating aspects of the FA 1 and FA 2 of the transmission resource of FIG. 5 as allocated to the mobile stations using two FAs. In FIG. 5, the two mobile stations 200 are allocated the resources from the FA 1 and FA 2 according to corresponding address type. Here, the reference letters (e) and (f) denotes the aspects of the resources allocated to the fifth and sixth mobile stations 205 and 206. Table 5 shows exemplary resource allocation information (MAP-IE) about the resources allocated to the first to sixth mobile stations 201 to 206 as shown in FIG. 4.

TABLE 5

| | start-length | start-end |
|---|---|---|
| First Mobile Station | CID1 (4 FA MS) MCS | |
| | Start: 26, Length: 4 | Start: 26, End: 29 |
| | Addr_type: 1 | Addr_type: 1 |
| | Etc. (power, MIMO related) | |
| Second Mobile Station | CID2 (4 FA MS) MCS | |
| | Start: 16, Length: 4 | Start: 16, End: 19 |
| | Addr_type: 2 | Addr_type: 2 |
| | Etc (power, MIMO related) | |
| Third Mobile Station | CID3 (4 FA MS) MCS | |
| | Start: 4, Length: 8 | Start: 4, End: 11 |
| | Addr_type: 3 | Addr_type: 3 |
| | Etc (power, MIMO related) | |
| Fourth Mobile Station | CID4 (4 FA MS) MCS | |
| | Start: 24, Length: 8 | Start: 24, End: 31 |
| | Addr_type: 4 | Addr_type: 4 |
| | Etc (power, MIMO related) | |

TABLE 5-continued

| | start-length | start-end |
|---|---|---|
| Fifth Mobile Station | CID5 (4 FA MS, FA1/2) MCS | |
| | Start: 2, Length: 4 | Start: 2, End: 5 |
| | Addr_type: 1 | Addr_type: 1 |
| | Etc (power, MIMO related) | |
| Sixth Mobile Station | CID6 (2 FA MS, FA1/2) MCS | |
| | Start: 0, Length:4 | Start: 0, End: 3 |
| | Addr_type: 2 | Addr_type: 2 |
| | Etc (power, MIMO related) | |

Since the number of FAs is determined according to the available bandwidth of the mobile station 200, the number of bits for indicating the address type can be configured differently. The 4 FA mobile station can be allocated the resource with 4 different address types, such that the address type can be expressed with 2 bits. Whereas, the 2 FA mobile station can be allocated the resource with 2 different address types, such that the address type can be expressed with 1 bit.

In the resource allocation information of table 5, the first and fifth mobile stations 201 and 205 are allocated transmission resources with the same address type (Addr_type: 1). Since the first and fifth mobile stations 201 and 205 know the number of supportable FAs, they can interpret the resource type appropriate for themselves. That is, an address type can be interpreted differently according to the supportable number of FAs of the mobile station 200. In case that the address type is 0, the mobile station 200 using 4 FAs interprets the address type as shown in the aspect (a) of FIG. 3, and the mobile station 200 using 2 FAs interprets the address type as shown in the aspect (e) of FIG. 5.

Referring to the aspect (e) of FIG. 5, the first address type using 2 FA (Addr_type 1) supports the FA 1 and FA 2 and designates the addresses for the transmission resource blocks of FA 1 and then the transmission blocks of FA 2. In the aspect (e) of FIG. 5, the fifth mobile station 205 is allocated the transmission blocks with the addresses 2 to 5 designated in sequential order within the FA 1.

Accordingly, the resource allocated to the fifth mobile station 205 can be expressed with the start address (start: 2) and the length (length: 4) from the start transmission resource block to the end transmission resource block. The resource allocated to the fifth mobile station 205 also can be expressed with the start address (start: 2) and the end address (end: 5) of the allocated transmission blocks.

Referring to the aspect (f) of FIG. 5, the second address type using 2 FA (Addr_type 2) supports the FA 1 and FA 2, and designates the addresses for the transmission resource blocks of the FA 1 and FA 2 in zigzag pattern. In the aspect (f) of FIG. 5, the sixth mobile station 206 is allocated the transmission resource blocks with the addresses 0 to 3 designated in zigzag pattern within the FA 1 and FA 2.

Accordingly, the resource allocated to the sixth mobile station 205 can be expressed with the start address (start: 0) and the length (length: 4) from the start transmission resource block to the end transmission resource block. The resource allocated to the sixth mobile station 206 also can be expressed with the start address (start: 0) and the end address (end: 3) of the allocated transmission blocks.

In an exemplary embodiment of the present invention as described above, the address type can be varied according to the number of supportable FAs, and the mobile station 200 can identify the address type with reference to the number of supportable FAs.

In the previously described embodiment, the base station 100 allocates the transmission resource according to the available bandwidth of the mobile station 200. The transmission resource block is a basic unit of resource allocation, and each FA includes multiple transmission resource blocks.

In the frequency overlay system, the mobile station 200 can use multiple frequency bands. By allocating the transmission resource across multiple frequency bands, it is possible to obtain diversity gain. How to obtain the diversity gain with the multiple FAs each having multiple transmission resource blocks as the basic resource allocation units is described hereinafter.

Figure 6:
FIGS. 6 to 8 are diagrams illustrating a method for allocating transmission resource and generating resource allocation information in a frequency overlay system according to an exemplary embodiment of the present invention.
Figure 7:
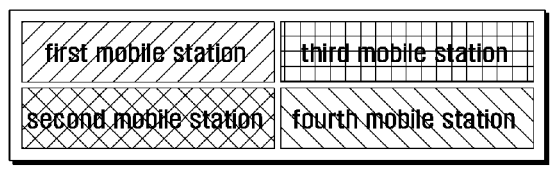
Figures 8, 9:
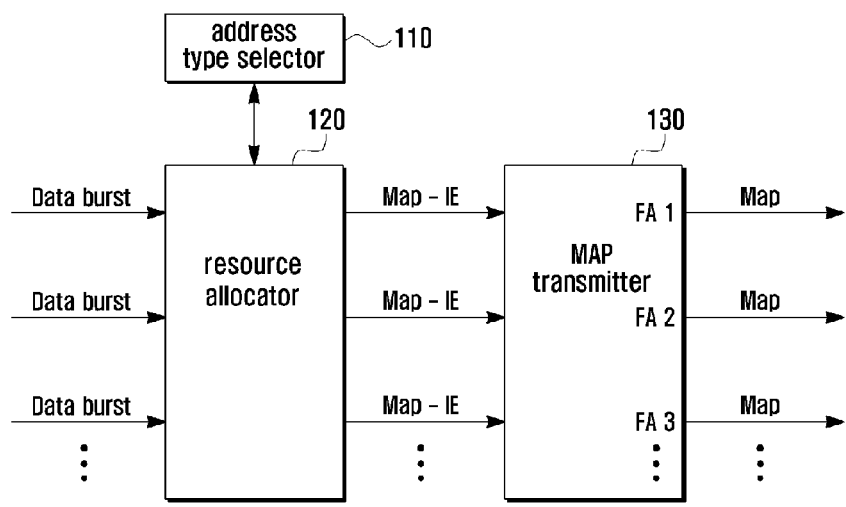
FIG. 9 is a block diagram illustrating a configuration of a resource allocation apparatus of a mobile station for a frequency overlay system according to an exemplary embodiment of the present invention.

FIGS. 6 to 8 are diagrams illustrating a method for allocating transmission resource and generating resource allocation information in a frequency overlay system according to an exemplary embodiment of the present invention.

In FIG. 6, each transmission resource block of each FA is subdivided into a maximum number of available FAs. Assuming that the maximum number of the available FAs is 4, each transmission resource block is divided into 4 sub-transmission resource blocks.

In case that each transmission resource block is divided into 4 sub-transmission resource blocks, the base station 100 can be configured to allocates the sub-transmission resource blocks across the multiple FAs according to the address type, resulting in frequency diversity gain.

For instance, in case that the available transmission resource is divided into multiple transmission resource blocks as shown in an aspect denoted by reference letter (a), each FA includes multiple transmission blocks as basic units of the transmission resource, each transmission resource block being referred to as R(1, 0). Each transmission resource block is divided into 4 sub-transmission resource blocks (e.g. the first transmission resource block R(1, 0) is divided into r(1, 0), r(2, 0), r(3, 0), and r(4, 0)) such that multiple frequencies can be used for transmission, resulting in frequency diversity gain.

That is, each transmission resource block is divided by the maximum number of FAs supported by the base station 100 so as to form such number of sub-transmission resource blocks, the sub-transmission resource blocks are allocated to a mobile station across multiple FAs according to an address type.

As described above, in an exemplary embodiment of the present invention, each transmission resource block is divided by the maximum number (n) of FAs supported by the base station 100, and the base station allocates the sub-transmission resource blocks as the new basic resource units to a mobile station across the n different FAs, thereby obtaining frequency diversity gain.

How to generate the resource allocation information for the transmission resource allocated with sub-resource allocation blocks across multiple FAs is described hereinafter. FIG. 7 shows an exemplary transmission resource of which each resource block is divided into multiple sub-transmission resource blocks as described with reference to FIG. 6.

The transmission resource managed by the base station 100 is composed of four frequency bands of FA 1 to FA 4, each FA being divided into multiple transmission resource blocks, and each transmission resource block being divided by the maximum number (n=4) of the FAs. The mobile station and the resource allocated thereto are expressed with the same hatching pattern. It is assumed that the first and second mobile stations 201 and 202 use 4 FAs and the third and fourth mobile stations 203 and 204 use 2 FAs.

How to designate the addresses for the resources to be allocated to the mobile stations 200 is described in detail.

FIG. 7 shows the patterns of the address designations for the respective mobile stations in accordance with the respective address types and locations of the resources indicated by the addresses. The resources allocated to the different mobile stations are expressed with different hatching patterns. Table 6 shows the resource allocation information (MAP-IE) about the resources allocated to the mobile stations as in FIGS. 6 and 7.

TABLE 6

|  | start-length | start-end |
|---|---|---|
| First Mobile Station | CID1 (4 FA MS) MCS | |
|  | Start: 0, Length: 3 | Start: 0, End: 11 |
|  | Addr_type: 4 | Addr_type: 4 |
|  | Etc. (power, MIMO related) | |
| Second Mobile Station | CID2 (4 FA MS) MCS | |
|  | Start: 6, Length: 2 | Start: 6, End: 13 |
|  | Addr_type: 3 | Addr_type: 3 |
|  | Etc (power, MIMO related) | |
| Third Mobile Station | CID3 (2 FA MS, FA 1/2) MCS | |
|  | Start: 3, Length: 2 | Start: 3, End: 10 |
|  | Addr_type: 1 | Addr_type: 1 |
|  | Etc (power, MIMO related) | |
| Fourth Mobile Station | CID4 (4 FA MS, FA 1/2) MCS | |
|  | Start: 28, Length: 1 | Start: 28, End: 31 |
|  | Addr_type: 2 | Addr_type: 2 |
|  | Etc (power, MIMO related) | |

Referring to the aspect (g) of FIG. 8 and table 6, the address type for allocating the transmission resource to the first mobile station 201 is type 4 (Addr_type: 4) which is identical with the address type described with reference to the aspect (d) of FIG. 3. The aspect (g) of FIG. 8 shows the transmission resource allocation in the same address designation pattern.

The base station 100 allocates the transmission resource blocks having the addresses 0 to 11 designated in address type 4 to the first mobile station 201. The transmission resource allocated to the first mobile station 201 can be expressed with the start address (start: 0) and the length (length: 3) from the start address to the end address of the allocated transmission resource according to the start-end indication scheme. Here, it is note that the length is counted in unit of transmission resource block but the address is designated in unit of sub-transmission resource block. The allocated transmission resource also can be expressed with the start address (start: 0) and the end address (end: 11) according to the start-end indication scheme.

Referring to the aspect (h) of FIG. 8 and table 6, the address type for allocating the transmission resource to the second mobile station 202 is type 3 (Addr_type: 3) which is identical with the address type described with reference to the aspect (c) of FIG. 3. The aspect (h) of FIG. 8 shows the transmission resource allocation in the same address designation pattern.

The base station 100 allocates the transmission resource blocks having the addresses 6 to 13 designated in address type 3 to the second mobile station 202. The transmission resource allocated to the second mobile station 202 can be expressed with the start address (start: 6) and the length (length: 2) from the start address to the end address of the allocated transmission resource according to the start-length indication scheme. Here, it is note that the length is counted in unit of transmission resource block. That is to say, the first length 1 of the allocated transmission resource is composed of the four sub-transmission resource blocks 6, 7, 8 and 9, and the second length 1 is composed of the four sub-transmission resource blocks 10, 11, 12, and 13 in the aspect (h). The allocated transmission resource also can be expressed with the start address (start: 6) and the end address (end: 13) according to the start-end indication scheme.

Referring to the aspect (i) of FIG. 8 and table 6, the address type for allocating the transmission resource to the third station 203 is type 1 (Addr-type: 1). The address type of type 1 designates the addresses for the FA 1 and FA 2, i.e. the for the transmission resource blocks of the FA 1 first and then the transmission resource blocks of the FA 2. The address type of type 1 is identical with the address type described with reference to the aspect (e) of FIG. 5.

The base station 100 allocates the transmission resource blocks having the addresses 3 to 10 designated in address type 1 to the third mobile station 203. The transmission resource allocated to the third mobile station 203 can be expressed with the start address (start: 3) and the length (length: 2) from the start address to the end address of the allocated transmission resource according to the start-length indication scheme. Here, it is note that the length is counted in unit of transmission resource block. The allocated transmission resource also can be expressed with the start address (start: 3) and the end address (end: 10) according to the start-end indication scheme.

Referring to the aspect (j) of FIG. 8 and table 6, the address type for allocating the transmission resource to the fourth station 204 is type 2 (Addr_type: 2) which is identical with the address type described with reference to the aspect (f) of FIG. 5. In the address type of type 2, the addresses are designated for the transmission address blocks of the FA 1 and FA 2 in zigzag pattern.

The base station 100 allocates the transmission resource blocks having the addresses 28 to 31 designate in address type 2 to the fourth mobile station 204. The transmission resource allocated to the fourth mobile station 204 can be expressed with the start address (start: 28) and the length (length: 1) from the start address to the end address of the allocated transmission resource according to the start-length indication scheme. The allocated transmission resource also can be expressed with the start address (start: 28) and the end address (end: 31) according to the start-end indication scheme.

As described above, in an exemplary embodiment of the present invention, each transmission resource allocation block is divided by the maximum number of available FAs of the base station such that transmission resource can be allocated to a mobile station across the FAs in unit of the sub-transmission resource allocation block, resulting in frequency diversity gain. Since the address type and addresses designated according to the address type are commonly adopted across the FAs, there is no need to generate the resource allocation information for all the FAs, resulting in reduction of resource allocation information (MAP-IE) overhead.

The structures of the base station 100 and mobile station 200 for implementing the above described resource allocation method are described hereinafter. The structure of a base station for the frequency overlay system according to an exemplary embodiment of the present invention is described first. FIG. 9 is a block diagram illustrating a configuration of a resource allocation apparatus of a mobile station for a frequency overlay system according to an exemplary embodiment of the present invention.

Referring to FIG. 9, the resource allocation apparatus of the mobile station 100 includes an address type selector 110, a resource allocator 120, and a MAP transmitter 130.

The address type selector 110 is responsible for selecting an address type to designate for the transmission resource. The address type selector 110 selects the address type in consideration of a number of supportable FAs and FA numbers according to the available bandwidth of the mobile station. That is, the address type selector 110 considers the supportable FAs, FA numbers, and data size of the mobile stations when selecting the resource types for the respective mobile stations 200. By selecting the address types for the mobile stations in such manner, the base station can achieve load balancing across FAs and maximizing the system throughput.

The resource allocator 120 is responsible for allocating transmission resource to the mobile stations 200 and outputs resource allocation information (MAP-IE) to the MAP transmitter 130. The resource allocator 120 also allocates the transmission resource in consideration of the number of supportable FAs and FA numbers of the mobile stations 200. After allocating the transmission resource, the resource allocator 120 generates resource allocation information (MAP-IE) with the address types and addresses of the resource blocks designated with the respective address types and outputs the resource allocation information (MAP-IE) to the MAP transmitter 130. The data burst of each mobile station is indicated with the least number of indicators for the transmission resource. As described above, the resource indicator can include the address type and address values designated for the transmission resource. The address values can be expressed in a start-length indication scheme or a start-end indication scheme. Referring to the exemplary resource allocation information of table 1, the exemplary resource allocation information includes an address type indicating the first address type (Addr_type: 1) and a designated address value expressed in a start-length indication scheme (start: 26, length: 4) or a start-end indication scheme (start: 26, end: 29).

The resource allocator 120 generates the resource allocation information (MAP-IE) including information on the Connection ID (CID), Modulation and Coding Scheme (MCS), power, and antenna along with the address type and resource indicator.

The MAP transmitter 130 generates a MAP message by collecting the resource allocation information (MAP-IE) for the primary FAs of the respective mobile stations. Next, the MAP transmitter 130 generates a MAP message for all FAs and transmits the MAP message through a corresponding FA.

Figure 10:
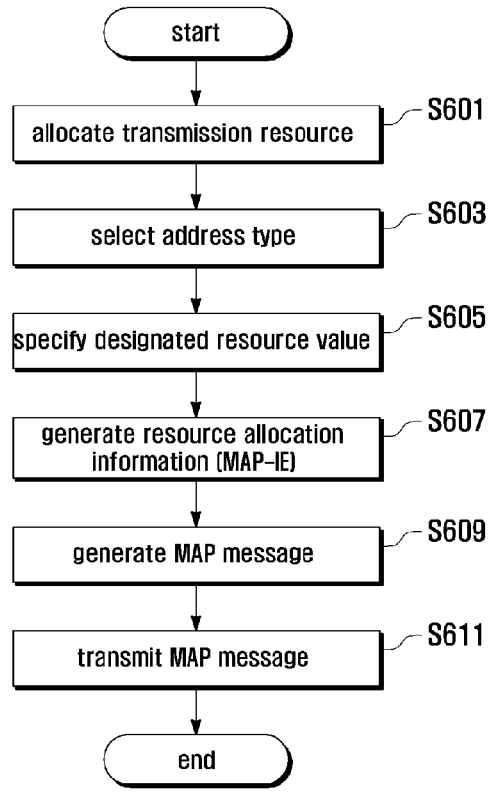
FIG. 10 is a flowchart illustrating a resource allocation information generation process of a resource allocation method according to an exemplary embodiment of the present invention.

How to generate the resource allocation information (MAP-IE) is described hereinafter. FIG. 10 is a flowchart illustrating a resource allocation information generation process of a resource allocation method according to an exemplary embodiment of the present invention.

Referring to FIG. 10, the base station 100 first allocates the transmission resource in consideration of available bandwidth of the mobile stations 200 (601). That is, the base station 100 determines a number of supportable FAs and FA numbers of each mobile station 200 according to the mobile station's available bandwidth and allocates the transmission resources in consideration of the supportable FAs and FA numbers.

Next, the base station 100 selects an address type appropriated for the transmission resource allocated to the mobile station 200 (603). At this time, the base station 100 determines the address type in consideration of the supportable FAs and FA numbers of the mobile station 200. Next, the base station 100 specifies the address of the allocated transmission resource according to the selected address type in the resource allocation information (MAP-IE) (605).

As a consequence, the base station 100 generates the resource allocation information (MAP-IE) including the address type and address of the allocated transmission resource (607). Next, the base station 100 generates a MAP message using the resource allocation information of the mobile stations in association with their respective primary FAs (609) and transmits the MAP message to the mobile stations 200 (611).

As described above, the MAP message is transmitted to the respective mobile stations 200, and each mobile station 200 extracts the resource allocation information (MAP-IE) destined to it from the MAP message and identifies the transmission resource allocated to it with reference to the resource allocation information (MAP-IE).

Figure 11:
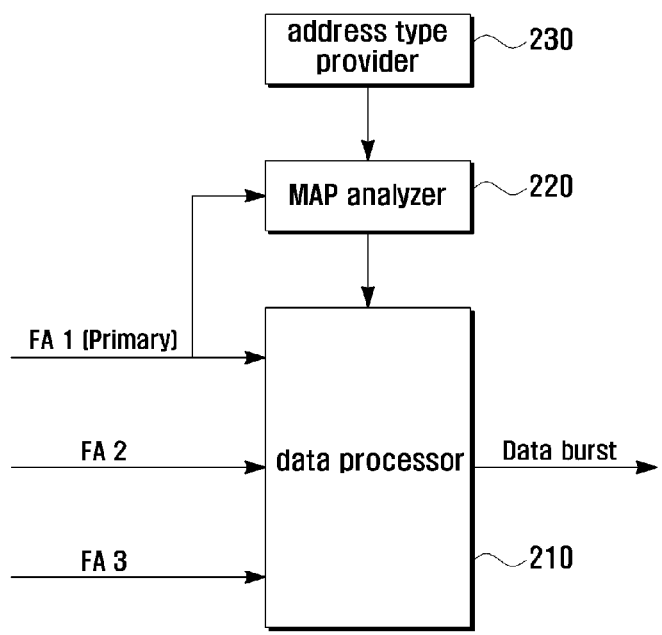
FIG. 11 is a block diagram illustrating a configuration of a resource allocation apparatus of a mobile station according to an exemplary embodiment of the present invention.

The structure of a mobile station for the frequency overlay system according to an exemplary embodiment of the present invention is described hereinafter. FIG. 11 is a block diagram illustrating a configuration of a resource allocation apparatus of a mobile station according to an exemplary embodiment of the present invention.

Referring to FIG. 11, the resource allocation apparatus of the mobile station 200 according to an exemplary embodiment of the present invention includes a data processor 210, a MAP analyzer 220, and an address type provider 230.

The data processor 210 receives the MAP message through the primary FA of the mobile station 200 and data through the FAs including the primary FA. The data processor 210 also receives the signal corresponding to the transmission resource region allocated to the mobile station with reference to the resource allocation information (MAP-IE) detected by the MAP analyzer and outputs a data burst by performing demodulation and decoding on the received signal. At this time, the data processor 210 performs the demodulation and decoding according to the Modulation and Coding Scheme (MCS) indicated by the resource allocation information.

The MAP analyzer 220 extracts the resource allocation information of the mobile station 200 from the MAP message received through the primary FA of the mobile station 200. Next, the MAP analyzer 220 extracts the Connection ID (CID), Modulation and Coding Scheme (MCS), and resource indicator from the resource allocation information (MAP-IE). The resource indicator includes the address type and designated address value. The MAP analyzer 220 determines the address system of the entire transmission resource according to the address type and outputs the transmission resource region obtained by interpreting the designated address value to the data processor 210.

The address type provider 230 records the supportable FAs according to the available bandwidth of the mobile station and address type related to the supportable FAs. The address type provider 230 also outputs information on the address type indicated by the resource allocation information (MAP-IE) to the MAP analyzer 220. The MAP analyzer 220 interprets the transmission resource region allocated to the mobile station 200 based on address type information provided by the address type provider 230 and outputs the interpreted transmission region to the data processor 210.

Referring to the exemplary resource allocation information of table 1, the resource allocation information includes the address type indicating the first address type (Addr_type: 1) and a designated address value expressed in a start-length indication scheme (start: 26, length: 4) or a start-end indication scheme (start: 26, end: 29), such that the mobile station 200 can identify the address system of the transmission resource according to the address type and the location of the transmission resource blocks allocated to the mobile station with reference to the designated address value. As a consequence, the mobile station can demodulate and decode the data transmitted through the transmission resource region allocated to it.

Figure 12:
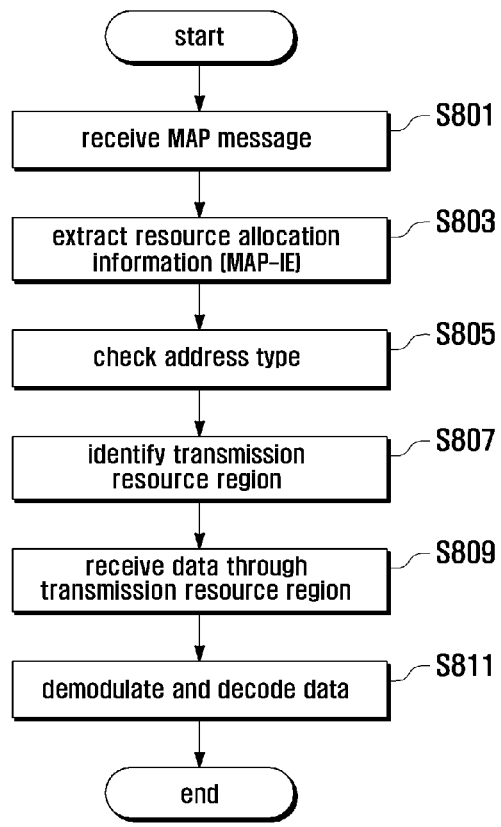
FIG. 12 is a flowchart illustrating a resource allocation information reception process of a resource allocation method according to an exemplary embodiment of the present invention.

How to receive the resource allocation information (MAP-IE) is described hereinafter. FIG. 12 is a flowchart illustrating a resource allocation information reception process of a resource allocation method according to an exemplary embodiment of the present invention.

Referring to FIG. 12, the mobile station 200 receives a MAP message through its primary FA (801). Here, the primary FA is determined when the mobile station 200 initially accesses the base station 100. Next, the mobile station 200 extracts the resource allocation information (MAP-IE) destined to it from the received MAP message (803). The MAP message includes multiple resource allocation information elements (MAP-IEs) transmitted through primary FAs of multiple mobile stations, and each mobile station can extract its resource allocation information (MAP-IE) from the MAP message using an identifier.

After extracting the resource allocation information (MAP-IE), the mobile station 200 checks the address type and designated address value from the resource allocation information (MAP-IE) (805) and recognizes the allocated transmission resource region by interpreting the designated address value according to the address type (807). Next, the mobile station 200 receives the data through the allocated transmission resource region (809). As described above, the mobile station 200 can receive the data transmitted through the allocated transmission data region that is identified with reference to the address type and designated address value included in the resource allocation information (MAP-IE). Finally, the mobile station 200 demodulates and decodes the data received through the allocated transmission resource region using the Modulation and Coding Scheme (MCS) indicated by the resource allocation information (MAP-IE).

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A base station for a frequency overlay system in which available frequency bandwidth is divided into a plurality of frequency bands, comprising:
   a controller configured to control selecting an address type
      to be used for allocating transmission resource to one of
      mobile stations connected to the base station according
      to supportable Frequency Assignments (FAs) of the
      mobile station, the address type indicating, for the
      mobile station connected to the base station, an order to
      designate addresses for resource blocks of the transmission resource of the base station,
   to control allocating resources to transmit data, and
   to control generating a MAP message including resource
      allocation information including the address type
      selected by the address type selector and an address
      value indicating a resource region allocated according to
      the address type; and
   a transmitter configured to transmit the MAP message
      through a primary FA of the mobile station.

2. The base station of claim 1, wherein the address type is characterized in that the base station divides each of transmission blocks constituting the transmission resource by a maximum number of Frequency Assignments (FAs) into a plurality of sub-transmission resource blocks and allocates the transmission resource in units of sub-transmission resource blocks across the FAs according to the order indicated by the address type.

3. The base station of claim 1, wherein the address value indicates a resource region included in a FA different from the primary FA.

4. The base station of claim 1, wherein the resource regions includes a first resource region and a second resource region and the first resource region and the second resource region are included in different FAs.

5. The base station of claim 1, wherein the address value indicates a start address and a length of or an end address of the resource region allocated according to the address type.

6. A resource allocation method of a base station for a frequency overlay system in which available frequency bandwidth is divided into a plurality of frequency bands, comprising:

generating a MAP message including the resource allocation information including an address type selected among multiple address types and to be used for allocating a transmission resource to one of mobile stations connected to the base station and an address value indicating a resource region allocated according to the address type, the address type indicating, for a mobile station connected to the base station, an order to designate addresses for resource blocks of the transmission resource of the base station; and transmitting the MAP message through a primary Frequency Assignment (FA) of the mobile station.

7. The resource allocation method of claim 6, wherein the address type is characterized in that the base station divides each of transmission blocks constituting the transmission resource by a maximum number of FAs into a plurality of sub-transmission resource blocks and allocates the transmission resource in units of sub-transmission resource blocks across the FAs according to the order indicated by the address type.

8. The resource allocation method of claim 6, wherein the address value indicates a resource region included in a FA different from the primary FA.

9. The resource allocation method of claim 6, wherein the resource regions includes a first resource region and a second resource region and the first resource region and the second resource region are included in different FAs.

10. The resource allocation method of claim 6, wherein the address value indicates a start address and a length of or an end address of the resource region allocated according to the address type.

11. A mobile station for a frequency overlay system in which available frequency bandwidth is divided into a plurality of frequency bands, comprising:

a receiver configured to receive a MAP message through a primary Frequency Assignment (FA) of the mobile station; and a controller configured to control identifying resource allocation information from the MAP message, the resource allocation information including an address type selected among multiple address types and to be used for allocating a transmission resource to the mobile station connected to a base station and an address value designated according to the address type, the address type indicating, for the mobile station connected to the base station, an order to designate addresses for resource blocks of the transmission resource of the base station, to control identifying a transmission resource region allocated to the mobile station based on the address type and the address value, and to control processing data received through the identified transmission resource region.

12. The mobile station of claim 11, wherein the address type is characterized in that the base station divides each of transmission blocks constituting the transmission resource by a maximum number of Frequency Assignments (FAs) into a plurality of sub-transmission resource blocks and allocates the transmission resource in unit of sub-transmission resource blocks across the FAs according to the order indicated by the address type.

13. The mobile station of claim 11, wherein the address value indicates a transmission resource region included in a FA different from the primary FA.

14. The mobile station of claim 11, wherein the transmission resource region includes a first transmission resource region and a second transmission resource region and the first transmission resource region and the second transmission resource region are included in different FAs.

15. The mobile station of claim 11, wherein the address value indicates a start address and a length of or an end address of the identified transmission resource region.

16. A resource allocation method of a mobile station for a frequency overlay system in which available frequency bandwidth is divided into a plurality of frequency bands, comprising:

identifying resource allocation information from a MAP message received through a primary frequency assignment of the mobile station, the resource allocation information including a selected address type to be used for allocating a transmission resource to the mobile station connected to a base station and an address value designated according to the address type, the address type indicating, for the mobile station connected to the base station, an order to designate addresses for resource blocks of the transmission resource of the base station; and receiving data through a transmission resource region identified based on the address type and the address value.

17. The resource allocation method of claim 16, wherein the address type is characterized in that the base station divides each of transmission blocks constituting the transmission resource by a maximum number of Frequency Assignments (FAs) into a plurality of sub-transmission resource blocks and allocates the transmission resource in unit of sub-transmission resource blocks across the FAs according to the order indicated by the address type.

18. The resource allocation method of claim 16, wherein the address value indicates a transmission resource region included in a FA different from the primary FA.

19. The resource allocation method of claim 16, wherein the transmission resource regions includes a first transmission resource region and a second transmission resource region and the first transmission resource region and the second transmission resource region are included in different FAs.

20. The resource allocation method of claim 16, wherein the address value indicates a start address and a length of or an end address of the identified transmission resource region.

* * * * *